United States Patent
Benter et al.

(10) Patent No.: US 10,895,677 B2
(45) Date of Patent: Jan. 19, 2021

(54) FIBER LIGHT MODULE FOR VEHICLE SIGNALING LIGHT

(71) Applicant: LUMILEDS LLC, San Jose, CA (US)

(72) Inventors: Nils Benter, Düsseldorf (DE); Sergej Kunz, Eschweiler (DE)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 16/385,754

(22) Filed: Apr. 16, 2019

(65) Prior Publication Data

US 2019/0317262 A1    Oct. 17, 2019

(30) Foreign Application Priority Data

Apr. 17, 2018 (EP) ..................................... 18167656

(51) Int. Cl.
| | |
|---|---|
| *F21V 8/00* | (2006.01) |
| *G02B 6/44* | (2006.01) |
| *G02B 6/02* | (2006.01) |
| *F21S 43/235* | (2018.01) |

(52) U.S. Cl.
CPC ............ *G02B 6/001* (2013.01); *F21S 43/235* (2018.01); *G02B 6/02052* (2013.01); *G02B 6/4403* (2013.01)

(58) Field of Classification Search
CPC .. G02B 6/001; G02B 6/4403; G02B 6/02052; F21S 43/235
See application file for complete search history.

(56) References Cited

U.S. PATENT DOCUMENTS

| | | |
|---|---|---|
| 2006/0198587 A1 | 9/2006 | Lee |
| 2006/0203508 A1 | 9/2006 | Lee |
| 2011/0103757 A1 | 5/2011 | Alkemper et al. |

FOREIGN PATENT DOCUMENTS

EP    2216587 A1    8/2010

*Primary Examiner* — Joseph L Williams
(74) *Attorney, Agent, or Firm* — Volpe Koenig (57) ABSTRACT

The invention describes a fiber light module comprising at least two light distribution fibers, wherein each light distribution fiber is enclosed in a corresponding fiber guiding tube, wherein the fiber guiding tubes are at least partly translucent and mechanically coupled by a stabilization structure, wherein the fiber light module further comprises a guiding structure mechanically coupled to the stabilization structure by means of a mechanical coupling interface, wherein the guiding structure is arranged to preserve a spatial arrangement of the stabilization structure along the mechanical coupling interface. The invention further describes a vehicle signaling light assembly comprising such a fiber light module and a vehicle signaling light which comprises such a vehicle signaling light assembly or fiber light module.

15 Claims, 6 Drawing Sheets

FIBER LIGHT MODULE FOR VEHICLE SIGNALING LIGHT

FIELD OF INVENTION

The invention relates to a fiber light module for a vehicle signaling light. The invention further relates to a vehicle signaling light assembly comprising the fiber light module, and a vehicle signaling light comprising the vehicle signaling light assembly.

BACKGROUND

Latest lighting designs of concept cars show the trend to very thin illuminated lines. The integration of such light guiding and emitting fibers into the vehicle and especially car lamps and/or body is challenging because each mechanical touch/contact point to the fiber surface frustrates Total Internal Reflection (TIR) resulting in light leakage and hot spot generation. Mechanical touch/contact points therefore create an inhomogeneity and losing of light. Assembly of light assemblies comprising such light guides is currently complex and cost intensive.

US 2011/0103757 A1 refers to a side-emitting step index fiber comprising a light-guiding core made from glass and a transparent and/or translucent cladding.

US 2006/0198587 A1 relates to assemblies of luminous ornaments having optical fiber cables arranged in parallel, each formed by luminous optical fibers sheathed with a transparent tube.

SUMMARY

It is an object of the present invention to enable a flexible and cost-effective design of vehicle signaling lights, especially vehicle signaling lights comprising semiconductor light sources like LEDs or lasers.

The invention is defined by the independent claims The dependent claims define advantageous embodiments.

According to a first aspect a fiber light module comprising at least two light distribution fibers is provided. Each light distribution fiber is enclosed in a corresponding fiber guiding tube. The fiber guiding tubes are at least partly translucent and mechanically coupled by a stabilization structure. The fiber light module further comprises a guiding structure mechanically coupled to the stabilization structure by means of a mechanical coupling interface. The guiding structure is arranged to preserve a spatial arrangement of the stabilization structure along the mechanical coupling interface. The stabilization structure is arranged to provide a mechanical interface to a fixture of a vehicle signaling light.

The light distribution fibers and the fiber guiding tubes are flexible such that the fiber light module can be adapted to essentially any luminaire geometry. The guiding structure stabilizes in combination with the fiber guiding tube spatial arrangement of the fiber light module and especially the thin light distribution fibers in accordance with the intended shape, especially three-dimensional shape, of the fiber light module. The stabilization structure coupled to the fiber guiding tubes and the guiding structure provides a defined spatial relation between the fiber guiding tubes and thus the light distribution fibers. The fiber guiding tubes are in tight physical contact with the light distribution fibers such that unwanted variations of the light outcoupling along the extension of the light distribution fibers are avoided. The fiber guiding tubes fix the fiber mechanically with minimized surface touch which minimizes light losses and inhomogeneity. Homogeneity of light emission may therefore be improved.

There may alternatively be an optical coupling material which is arranged between the light distribution fibers and the fiber guiding tubes (e.g. optical coupling gel which is characterized by a refractive index higher than the refractive index of the fiber guiding tube). The optical coupling material is arranged to provide a defined boundary between the light distribution fiber and the fiber guiding tube.

The light distribution fibers are arranged to distribute light received via a light in-coupling surface across the linear extension of the flexible light distribution fiber. Material properties may therefore be arranged in accordance with the intended light distribution and the intended path of the flexible light distribution fiber. The flexible light distribution fiber may, for example, comprise materials selected out of the group plastic materials, silicones or glass. The properties of the material or material composition may vary along the extension of the flexible light distribution fiber. The properties of the material or material composition may especially be arranged to enable a defined light distribution along the extension of the flexible light distribution fiber if the light source with a predefined intensity is coupled to a light in-coupling surface. The material or material composition may, for example, comprise scattering particles which are distributed within the material of the material composition to provide the intended lighting effect (e.g. homogeneous light emission along the linear extension of the light distribution fiber). The material or the material composition of the light distribution fiber may be doped with light converting particles. The light converting particles may be arranged to locally convert light of a first wavelength range to light of a second wavelength range, wherein the second wavelength range is in a longer wavelength range than the first wavelength range. The light in-coupling surface may be one end surface of the light distribution fiber. Alternatively, a light in-coupling structure may be provided at both end surfaces.

The light distribution fiber may have a cross section with an area between 0.5 $mm^2$ and 20 $mm^2$, preferably between 1.50 $mm^2$ and 10 $mm^2$ and most preferably between 3 $mm^2$ and 7 $mm^2$. A cross-section of the light distribution fiber may be arranged to provide a predefined lighting effect. The cross-section of the flexible light distribution fiber may vary along the extension of the light distribution fiber. The light distribution fiber may, for example, have a circular cross-section with a diameter between 0.5 mm and 5 mm, preferably between 1 mm and 4 mm and most preferably between 2 mm and 3 mm. The light distribution fiber may alternatively have a non-circular cross-section (e.g. triangular, rectangular etc.).

The fiber guiding tube may alternatively or in addition be arranged to modify light distribution provided by the light distribution fiber. At least one of the fiber guiding tubes may, for example, comprise at least one light manipulation structure arranged to locally change, for example, light outcoupling of light guided by means of the enclosed light distribution fiber.

The guiding structure may comprise any material which can be deformed, and which preferably keeps the shape after deformation. The guiding structure may comprise a guiding material characterized by a Young's modulus of at least 30 GPa, preferably at least 50 GPa. The stabilization material rules the mechanical properties of the guiding structure. The guiding structure may, for example, comprise a bendable metal wire (e.g. aluminium, copper, steel and the like). The guiding structure may alternatively comprise a plastic material which can be deformed e.g. during application of an elevated temperature. The shape of the guiding structure may be defined during assembly in the vehicle signaling light or may be pre-shaped. The guiding material may be enclosed in a flexible cladding bonded to the stabilization structure.

The stabilization structure may be arranged to define a maximum distance between the light distribution fibers in a direction perpendicular to a longitudinal extension of the light distribution fibers. The defined maximum distance between the light distribution fibers supports the defined spatial relationship between the light distribution fibers.

The stabilization structure may, for example, comprise a bendable foil. The bendable foil may comprise materials like plastic, metals and the like. The bendable foil may, for example, be transparent in the visual wavelength range such that additional light sources can emit light through the stabilization structure.

The stabilization structure may, for example, be arranged to provide a continuous mechanical coupling to the mechanical coupling interface of the guiding structure along a longitudinal extension of the guiding structure.

The stabilization structure may comprise a stabilization material characterized by a Young's modulus of at least 0.3 GPa, preferably of at least 0.5 GPa and most preferably of at least 1 GPa. The stabilization material rules the mechanical properties of the stabilization structure. Plastic materials like PET may be used to arrange the fiber light module and especially the light distribution fibers in accordance with the mechanical boundaries given by the respective vehicle signaling light.

The stabilization structure may alternatively be arranged to provide a discontinuous mechanical coupling to the mechanical coupling interface of the guiding structure along the longitudinal extension of the guiding structure. The stabilization structure may, for example, comprise a multitude of coupling elements arranged at predefined distances along a longitudinal extension of the guiding structure. The coupling elements may comprise or consist of a material with rather low Young's modulus like PET as described above. The coupling elements may alternatively comprise or consist of a rather stiff material which provides a locally predefined mechanical coupling between the guiding structure and the fiber guiding tubes. The coupling elements may, for example, comprise stiff plastic or metal braces.

The fiber guiding tubes may comprise a transparent plastic material bonded to the stabilization structure. The fiber guiding tubes may, for example, be adhered to the stabilization structure or may be integrated in the stabilization structure (e.g. transparent plastic foil with tubes in which the light distribution fibers can be introduced).

The fiber light module avoids complex and time intensive integration of lighting fibers into luminaires without losing light amount or homogeneity. The fiber light module further enables equidistance and symmetrical bending angle opening reproducible and predictable light pattern designs in automated manufacturing processes. Finally, the optical concept remains flexible and can be adapted to essentially any luminaire geometry.

According to a second aspect a vehicle signaling light assembly is provided. The vehicle signaling light assembly comprises a fiber light module according to any embodiment described above and at least one light source. The at least one light source (e.g. LED or laser) is arranged to couple in light in a lateral end surface (e.g. via an in-coupling facet) of the light distribution fiber.

According to a third aspect a vehicle signaling light is provided. The vehicle signaling light comprises a fiber light module according to any embodiment described above and at least one light source or at least one vehicle signaling light assembly in accordance with any embodiment described above. The vehicle signaling light further comprises an electrical interface. The electrical interface is arranged to transfer electrical signals to the at least one light source. The electrical signals may comprise an electrical drive current to drive the light source or light sources and control signals to control light emission of the light source(s).

The vehicle signaling light may further comprise an electrical driver for electrically driving the at least one light source.

The vehicle signaling light may further comprise at least one fixture. The at least one fixture is arranged to mechanically couple the fiber light module to the vehicle signaling light in accordance with a predefined spatial shape. The fixture may, for example, be a clamp which is arranged to provide continues clamping around the extension of the fiber light module. The vehicle signaling light may alternatively comprise a multitude of fixtures which are arranged to provide local mechanical interfaces between the vehicle signaling light and the fiber light module, especially the stabilization structure. The fixture or fixtures may be arranged such that the shape of the fiber light module is provided during assembly of the fiber light module or the vehicle light assembly in the vehicle signaling light. The vehicle signaling light may further comprise one or more support structures supporting the stabilization structure between the fiber guiding tubes. The support structures may, for example, be arranged to form the guiding structures during assembly of the vehicle signaling light. The fixture and/or the support structure may be arranged such that there is no direct contact to the light distribution fibers or the fiber guiding tubes. The fixture and/or the support structure or structures may alternatively or in addition be arranged such that there is a local interaction with the light distribution fiber or the fiber guiding tube to enable local manipulation of the light emitted by the respective light guiding structure.

The light source may be arranged to emit light in the visible spectrum and outside the visible spectrum (especially infrared). Optionally light sources with different emission spectrum may be coupled to one or both end surface.

It shall be understood that a preferred embodiment of the invention can also be any combination of the dependent claims with the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings.

DETAILED DESCRIPTION OF THE PREFERRED EMBODIMENTS

Various embodiments of the invention will now be described by means of the Figures.

Figure 1:
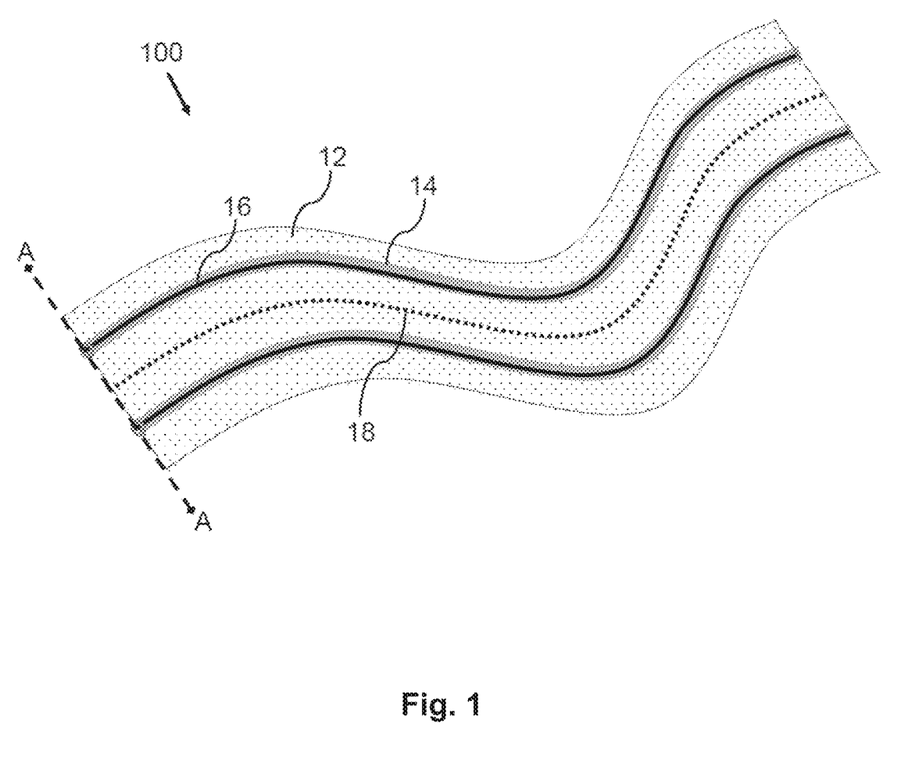
FIG. 1 shows a principal sketch of a perspective view of a first embodiment of the fiber light module

FIG. 1 shows a principal sketch of a perspective view of a first embodiment of the fiber light module 100. The fiber light module 100 comprises two light distribution fibers 16 which consist in this embodiment of glass. The two light distribution fibers 16 are embedded in two corresponding fiber guiding tubes 14 which consist of plastic material. The fiber guiding tubes 14 are bonded to a stabilization structure 12 which consists of a flexible plastic foil. A guiding structure 18 is embedded in the stabilization structure 12 to provide a mechanical coupling interface between the guiding structure 18 and the stabilization structure 12 which extends along the longitudinal extension of the guiding structure 18. The guiding structure 18 consist of a metal wire which enables shaping of the fiber light module 100 in accordance with essentially each three-dimensional shape. The fiber light module 100 can be pre-shaped by means of the guiding structure 18 wherein the stabilization structure 12 provides a defined spatial relation between the fiber guiding tubes 14 and therefore the light distribution fibers 16. The mechanical coupling interface provides in combination with the bendable stabilization structure 12 a kind of hinge which enables local bending of the fiber light module 100 in accordance with the flexibility of the chosen materials.

Figure 2:
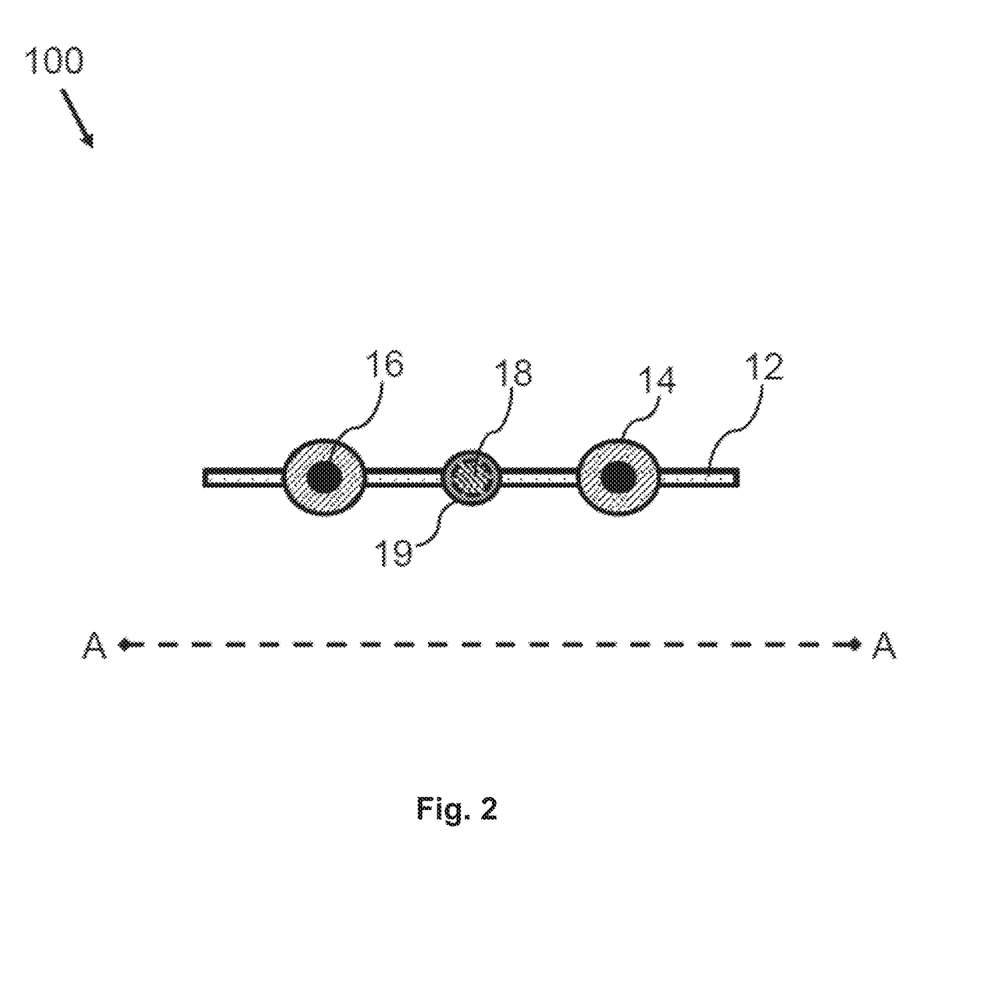
FIG. 2 shows a principal sketch of a cross-section of the first embodiment of the fiber light module along line A-A in FIG. 1

FIG. 2 shows a principal sketch of a cross-section of the first embodiment of the fiber light module 100 along line A-A shown in FIG. 1. The flexible light distribution fibers 16 are enclosed by the fiber guiding tubes 14. The guiding structure 18 is enclosed by the mechanical coupling interface 19. The guiding structure 18 and the light distribution fibers 16 are mechanically coupled by means of the stabilization structure 12. The fiber guiding tubes 14, the mechanical coupling interface 19 and the stabilization structure 12 consists of the same plastic material and are manufactured in one processing step. The guiding structure 18 and the light distribution fibers 16 may be embedded during production of the stabilization structure 12, the fiber guiding tubes 14 and the mechanical coupling interface 19. The guiding structure 18 and the light distribution fibers 16 may alternatively be inserted after production of the stabilization structure 12, the fiber guiding tubes 14 and the mechanical coupling interface 19. The stabilization structure 12, the fiber guiding tubes 14 and the mechanical coupling interface 19 may, for example, consist of a material which can be shrunk at elevated temperatures such that there is a tight mechanical coupling between the material and the inserted guiding structure 18 and light distribution fibers 16.

Figure 3:
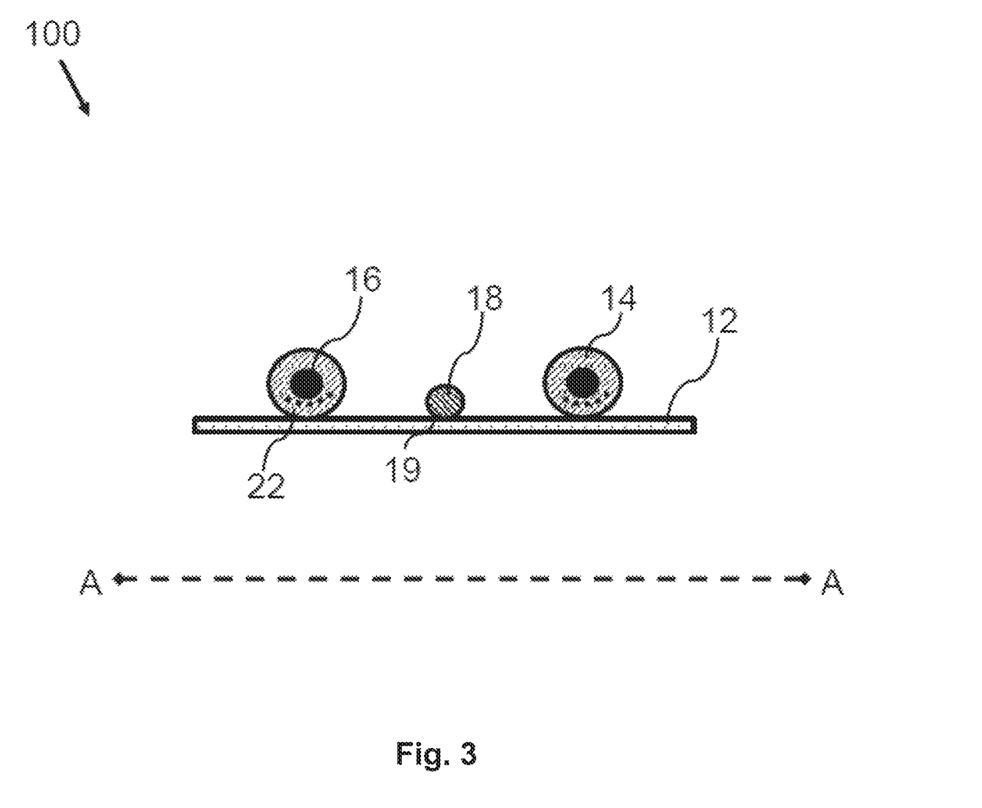
FIG. 3 shows a principal sketch of a cross-section of a second embodiment of the fiber light module corresponding to line A-A in FIG. 1

FIG. 3 shows a principal sketch of a cross-section of a second embodiment of the fiber light module 100 corresponding to line A-A in FIG. 1. The light distribution fibers 16 are embedded in corresponding fiber guiding tubes 14 and subsequently glued to the stabilization structure. The guiding structure 18 consists of a deformable plastic material which may be glued to the stabilization structure 12 in the same process step as the fiber guiding tubes 14. The stabilization structure 12 consists of a thin metal foil which provides mechanical coupling between the light distribution fibers 16 and the guiding structure 18 via the glue. The fiber guiding tubes 14 comprise local light manipulation structures 22 which are arranged to locally change the appearance of the light emitted by means of the fiber light module 100.

Figure 4:
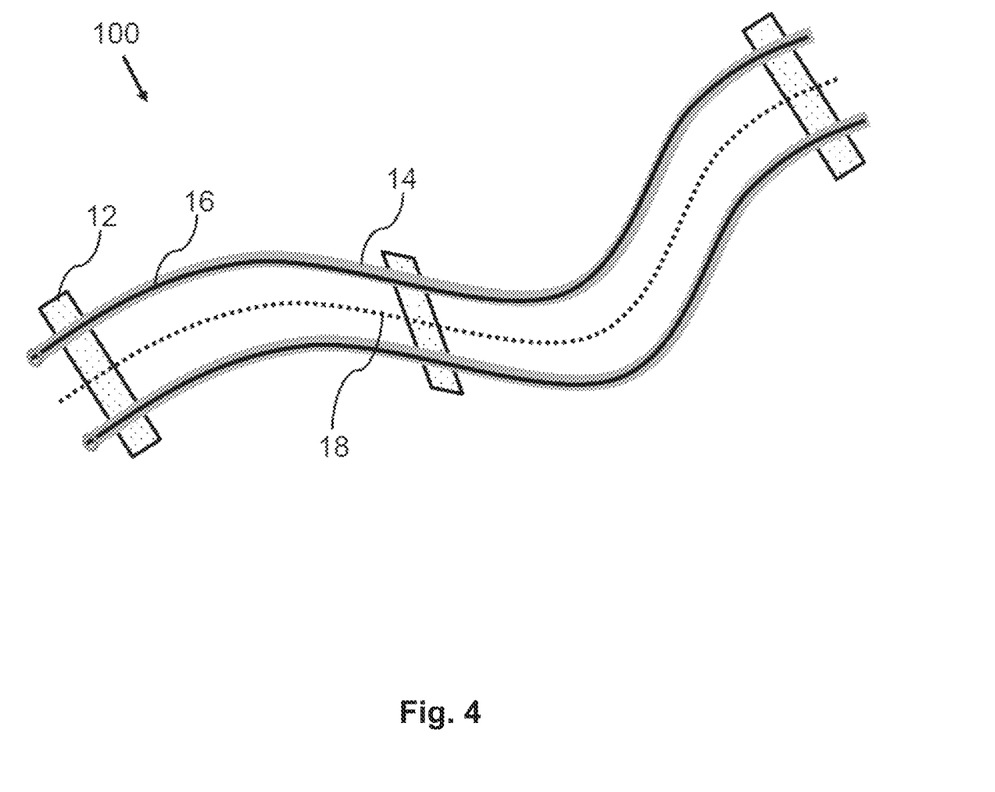
FIG. 4 shows a principal sketch of a perspective view of a third embodiment of the fiber light module

FIG. 4 shows a principal sketch of a perspective view of a third embodiment of the fiber light module 100. Two light distribution fibers 16 are embedded in corresponding fiber guiding tubes 14. The light distribution fibers 16 and the guiding structure 18 are bonded to a stabilization structure 12 which comprises several coupling elements or braces which provide a local mechanical coupling between the guiding structure 18 and the fiber guiding tubes 14. The mechanical coupling surface is in this embodiment restricted to the longitudinal extension of the coupling elements or braces (e.g. bonding surface). These braces consist of stiff material such that the spatial relationship between the guiding structure 18 and the fiber guiding tubes 14 is essentially fixed at the local position of the respective brace. The braces can be turned with respect to each other to enable a multitude of possible three-dimensional shapes of the light distribution fibers 16. Number and distance as well as individual size and shape of the braces may be adapted to the intended shape of the fiber light module 100.

Figure 5:
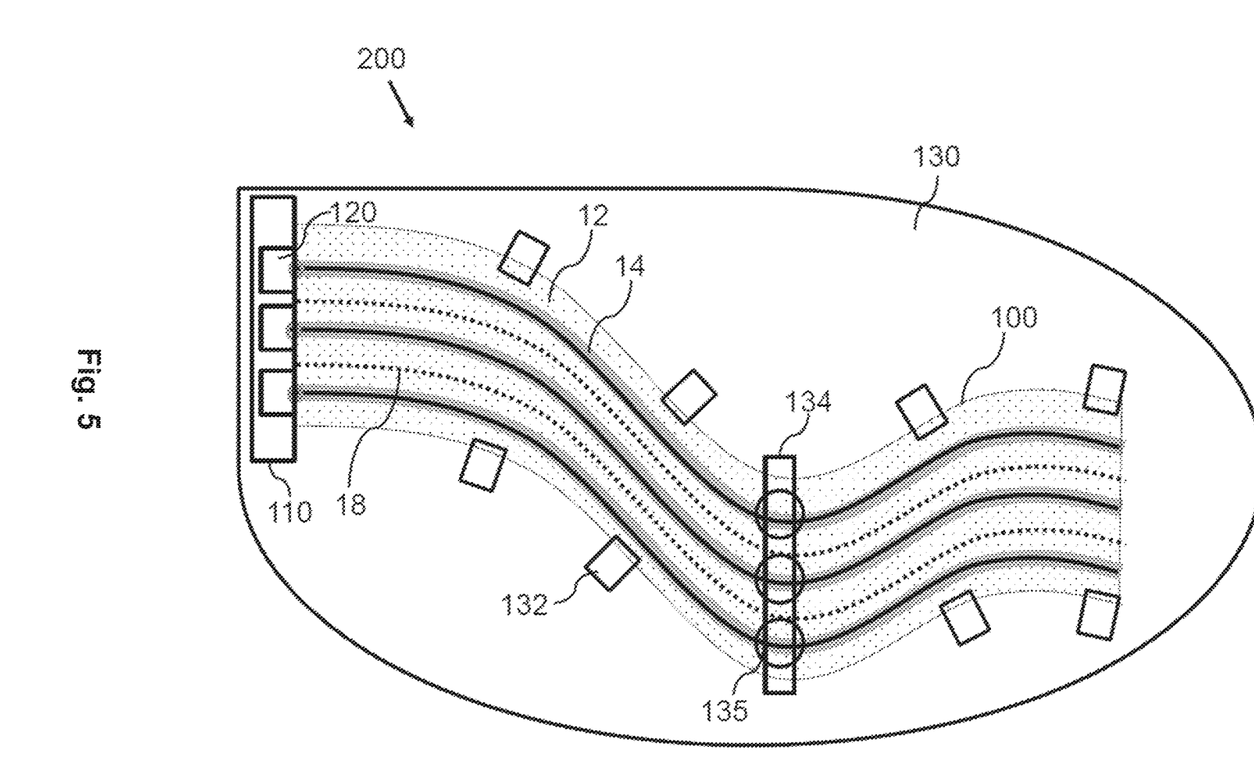
FIG. 5 shows a principal sketch of a first vehicle signaling light

FIG. 5 shows a principal sketch of a first vehicle signaling light 200. The vehicle signaling light comprises a vehicle signaling light assembly comprising a fiber light module 100 and corresponding light sources 120. The fiber light module 100 is very similar as the fiber light module 100 discussed with respect to FIG. 1. The main difference is that the fiber light module 100 comprises three light distribution fibers 16 and corresponding fiber guiding tubes 14. Two guiding structures 18 are arranged between two light distribution fibers 16. Each light distribution fiber 16 is coupled to a corresponding light source 120 (e.g. LED) by means of one light in-coupling facet. The light sources 120 are integrated in an electrical interface 110. The fiber light module 100 is mounted within a cover 130 by means of a multitude of fixtures 132. The fixtures 132 are arranged to fix the stabilization structure 12 at the outer rim of the fiber light module 100. The vehicle signaling light 200 further comprises in this embodiment an extended fixture 134 which extends across the whole stabilization structure 12 essentially perpendicular to the light distribution fibers 16 at the position of the extended fixture 134. Such extended fixtures 134 may be used to enable a precise definition of the three-dimensional arrangement of the light distribution fibers 16 within the boundaries given by the stabilization structure 12. The extended fixture 134 comprises in this embodiment three light outcoupling structures 135 which are optically coupled to the respective light distribution fiber 16. The light outcoupling structures 135 enable manipulation of the light output of the light distribution fiber 16 coupled to the light outcoupling structure 135. The light outcoupling structures 135 may be arranged to manipulate the light distribution, colour of the light and the like. The fixtures 132 and the extended fixture 134 with light outcoupling structures 135 define the three-dimensional shape of the light distribution fibers 16 within the cover 130.

Figure 6:
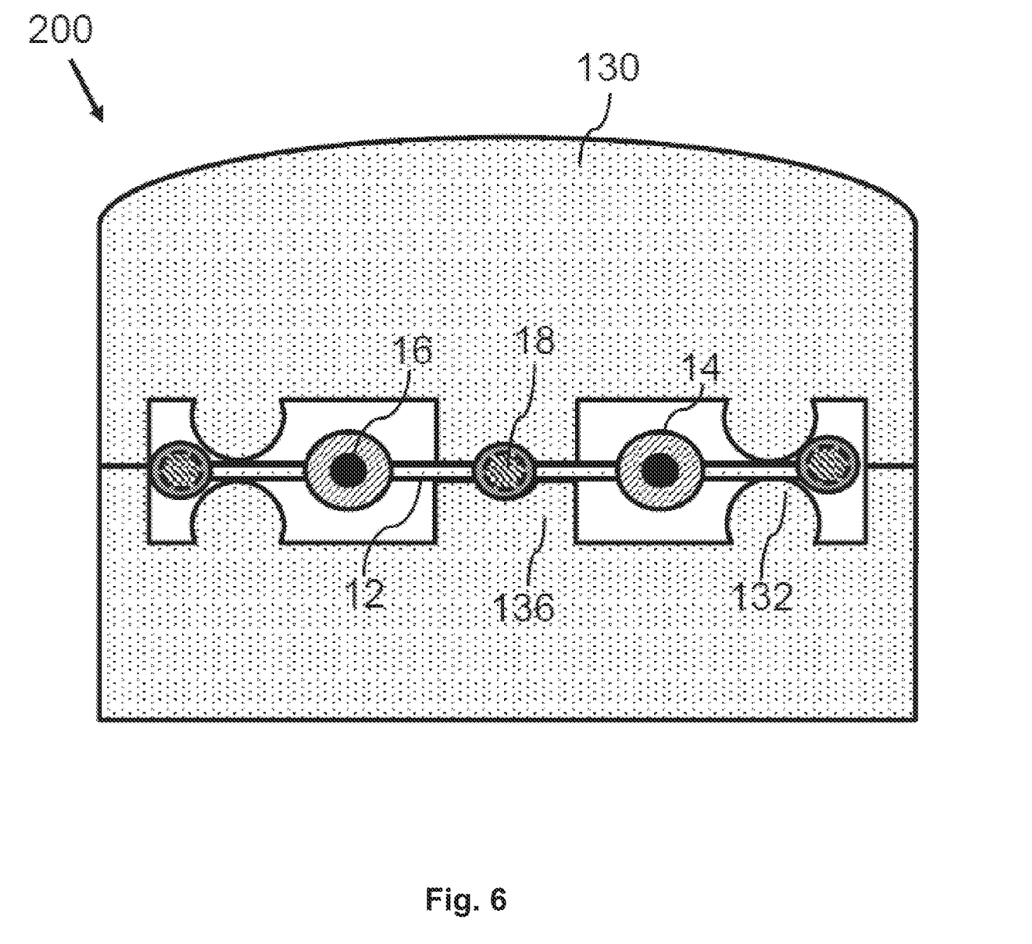
FIG. 6 shows a principal sketch of a second vehicle signaling light In the Figures, like numbers refer to like objects throughout. Objects in the Figures are not necessarily drawn to scale.

FIG. 6 shows a principal sketch of a cross-section of a second vehicle signaling light 200. The fiber light module 100 is similar as the fiber or light module discussed with respect to FIG. 2. Each fiber guiding tube 14 is in this embodiment arranged between two guiding structures 18. The guiding structures 18 at the outer rim of the fiber light module 100 may support assembly of the second vehicle signaling light 200. The second vehicle signaling light 200 comprises a cover 130 which consists of two parts. The cover 130 can be opened such that the fiber light module 100 can be positioned on fixtures 132 which are in this embodiment arranged continuously along the rim of the stabilization structure 12. The fiber light module 100 is further supported by a support structure 136 which is arranged underneath the guiding structure 18 when the fiber light module 100 is placed on the lower part of the cover 130. The fiber light module is fixed by means of the upper part of the cover 130 which clamps the fiber light module 100, and especially the stabilization structure 12, by means of fixtures 132 and a support structure 136 which correspond to the fixtures 132 and support structure 136 of the lower part of the cover 130. Each flexible light distribution fiber 16 is therefore arranged in a defined position within the cover 130. Each light distribution fiber 16 is in this embodiment surrounded by a cavity. The cavity may be shaped to support the light distribution. Two or more light distribution fibers 16 may be surrounded by common cavity in alternative embodiments. The vehicle signaling light may further comprise localized light sources which may be arranged to provide light spots. The local light source or sources may, for example be arranged to emit light through the stabilization structure 12 (e.g. arranged in one of the support structures 136 or fixtures 132).

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

REFERENCE SIGNS

12 stabilization structure
14 fiber guiding tube
16 light distribution fiber
18 guiding structure
19 mechanical coupling interface
22 light manipulation structure
100 fiber light module
110 electrical interface
120 light source
130 cover
132 fixture
134 extended fixture
135 light outcoupling structure
136 support structure
200 vehicle signaling light

What is claimed is:

1. A fiber light module comprising:
   at least two light distribution fibers with each light distribution fiber enclosed in a corresponding fiber guiding tube, the fiber guiding tubes being at least partly translucent and mechanically coupled by a stabilization structure; and
   a guiding structure mechanically coupled to the stabilization structure by means of a mechanical coupling interface, the guiding structure arranged to preserve a spatial arrangement of the stabilization structure along the mechanical coupling interface.

2. The fiber light module according to claim 1, wherein the stabilization structure is arranged to define a maximum distance between the light distribution fibers in a direction perpendicular to a longitudinal extension of the light distribution fibers.

3. The fiber light module according to claim 1, wherein the stabilization structure comprises a bendable foil.

4. The fiber light module according to claim 3, wherein the stabilization structure is arranged to provide a continuous mechanical coupling to the mechanical coupling interface of the guiding structure along a longitudinal extension of the guiding structure.

5. The fiber light module according to any one of claim 1, wherein the stabilization structure is arranged to provide a discontinuous mechanical coupling to the mechanical coupling interface of the guiding structure along the longitudinal extension of the guiding structure.

6. The fiber light module according to claim 5, wherein the stabilization structure comprises a multitude of coupling elements arranged at predefined distances along a longitudinal extension of the guiding structure.

7. The fiber light module according to claim 1, wherein the stabilization structure comprises a stabilization material characterized by a Young's modulus of at least 0.3 GPa, preferably of at least 0.5 GPa and most preferably of at least 1 GPa, wherein the stabilization material rules the mechanical properties of the stabilization structure.

8. The fiber light module according to claim 1, wherein the guiding structure comprises a guiding material characterized by a Young's modulus of at least 30 GPa, preferably at least 50 GPa, wherein the stabilization material rules the mechanical properties of the guiding structure.

9. The fiber light module according to claim 8, wherein the guiding structure comprises a bendable metal wire.

10. The fiber light module according to claim 8, wherein the guiding material is enclosed in a flexible cladding bonded to the stabilization structure.

11. The fiber light module according to claim 1, wherein the fiber guiding tubes comprises a transparent plastic material bonded to the stabilization structure.

12. The fiber light module according to claim 1, wherein at least one of the fiber guiding tubes comprises at least one light manipulation structure arranged to locally change light outcoupling of light guided by means of the enclosed light distribution fiber.

13. A vehicle signaling light assembly comprising:
   a fiber light module including at least two light distribution fibers with each light distribution fiber enclosed in a corresponding fiber guiding tube, the fiber guiding tubes being at least partly translucent and mechanically coupled by a stabilization structure;
   a guiding structure mechanically coupled to the stabilization structure by means of a mechanical coupling interface, the guiding structure arranged to preserve a spatial arrangement of the stabilization structure along the mechanical coupling interface; and at least one light source arranged to couple in light in a lateral end surface at least one of the at least two light distribution fibers.

14. A vehicle signaling light comprising:

at least one fiber light module including at least two light distribution fibers with each light distribution fiber enclosed in a corresponding fiber guiding tube, the fiber guiding tubes being at least partly translucent and mechanically coupled by a stabilization structure;

a guiding structure mechanically coupled to the stabilization structure by means of a mechanical coupling interface, the guiding structure arranged to preserve a spatial arrangement of the stabilization structure along the mechanical coupling interface;

at least one light source; and an electrical interface, the electrical interface arranged to transfer electrical signals to the at least one light source.

15. The vehicle signaling light according to claim 14 further comprising at least one fixture, wherein the at least one fixture is arranged to mechanically couple the fiber light module to the vehicle signaling light in accordance with a predefined shape.

* * * * *